United States Patent [19]
Culpen

[11] Patent Number: 5,542,799
[45] Date of Patent: Aug. 6, 1996

[54] MACHINE SCREW

[75] Inventor: James E. Culpen, Justin, Tex.

[73] Assignee: Agora Enterprises, L.L.P., Dallas, Tex.

[21] Appl. No.: 348,582

[22] Filed: Dec. 2, 1994

[51] Int. Cl.$^6$ .................................................. F16B 39/02
[52] U.S. Cl. ........................................ 411/271; 411/305
[58] Field of Search ................................ 411/271, 301, 411/305, 324, 947

[56] References Cited

U.S. PATENT DOCUMENTS

| | | | |
|---|---|---|---|
| 193,717 | 7/1877 | Lyon | 411/324 |
| 1,957,784 | 5/1934 | Johnson | 411/324 |
| 3,115,804 | 12/1963 | Johnson | 411/338 |
| 3,143,917 | 8/1964 | Conner | 411/271 |
| 3,202,194 | 8/1965 | Jones | 411/271 |
| 3,288,190 | 11/1966 | Holmes | 411/305 |
| 3,351,966 | 11/1967 | Pelochino | 411/324 |
| 3,810,279 | 5/1974 | Swick et al. | 24/73 P |
| 3,905,570 | 9/1975 | Nieuwveld | 248/71 |
| 4,396,329 | 8/1983 | Wollar | 411/508 |
| 4,571,136 | 2/1986 | Peek | 411/437 |
| 4,728,238 | 3/1988 | Chrisholm et al. | 411/510 |
| 4,759,670 | 7/1988 | Linder et al. | 411/43 |
| 4,776,739 | 10/1988 | Hamman | 411/510 |
| 4,787,795 | 11/1988 | Kraus | 411/510 |
| 4,850,778 | 7/1989 | Clough | 411/324 |
| 4,900,210 | 2/1990 | Buchanan | 411/508 |
| 4,902,182 | 2/1990 | Lewis | 411/510 |
| 5,011,356 | 4/1991 | Fernandez | 411/553 |
| 5,186,591 | 2/1993 | Malks | 411/301 |
| 5,292,217 | 3/1994 | Korpi | 411/324 |

FOREIGN PATENT DOCUMENTS 127840  9/1928  Switzerland.

Primary Examiner—Lloyd A. Gall
Assistant Examiner—Gary Estremsky
Attorney, Agent, or Firm—Willian Lloyd Clayborn; John M. Cone

[57] ABSTRACT

A shaft has a head attached at one end and terminates at the other end in a tapered tip. A slot passes through the shaft, extending from the end opposite the head at least partially along the length of the shaft. Helical thread segments extend along the shaft, matching the thread in the threaded hole. The screw is inserted by pushing it into the threaded hole; the shaft halves are compressed together until the outer diameter of the thread segments on the shaft is smaller than the inner diameter of the threads in the threaded hole. The shaft halves spring back to their uncompressed position after insertion. The thread segments on the shaft mesh with the thread in the hole, retaining the shaft in the hole after insertion. The shaft must be removed by unscrewing the shaft.

4 Claims, 1 Drawing Sheet

MACHINE SCREW

BACKGROUND OF THE INVENTION

1. Field of the Invention

This invention relates in general to fasteners, and in particular to a machine screw that can be inserted into a mating threaded hole without rotating the screw.

2. Description of the Related Art

Most push-in fasteners are variations on the "pine tree" or "Christmas tree" structure, in which a shaft has a number of fins or ribs extending out from the shaft, either perpendicularly or at an angle toward the head of the fastener. The ribs are designed to deform as the fastener is inserted into the receiving hole. This deformation provides the frictional force required to hold the fastener in place. Unfortunately, the deformation also prevents the device from being removed easily without being damaged. These devices therefore are not normally used where the fastener is expected to be removed and reinserted.

Screws have been used for centuries to hold items together. U.S. Pat. No. 4,900,210, issued to Buchanan et al., on Feb. 13, 1990, discloses a fastener that can be pushed in, but must be unthreaded. The device uses thread segments that remain deformed against the inner surface of the mating receptacle. The receptacle has one turn of thread located at the mouth of the receptacle to engage the thread segments for unscrewing the fastener. This structure requires a special receptacle, and is not well adapted to use with conventional threaded holes, especially with the type of thread used for machine screws.

A need remained for a push-in fastener that fits the threaded hole designed to hold a machine screw. A need also remained for a fastener that could be inserted at an angle without binding. remained in the hole until removed by unscrewing. As always, a fastener that is less expensive and simple to construct was also desired.

SUMMARY OF THE INVENTION

The general object of the invention is to fasten a workpiece against a surface with a threaded hole.

Another object of the invention is to permit at least partial insertion of the fastener by simply pushing the fastener into the hole.

Still another object is that the invention work in place of a conventional machine screw, so that no special receptacles or tools are required for installation and removal.

Yet another object is that the invention be self-correcting for angled insertion into the threaded hole.

Another object is that the invention be capable of being repeatedly removed and installed without being damaged.

These objects are achieved by a shaft having a helical thread designed to match the threaded hole, and having a slot passing through at least part of the shaft. The slot divides the shaft into two halves, each being covered with thread segments. The halves of the slotted shaft may be pressed towards each other, reducing the outer diameter of the threads on the shaft to one smaller than the internal diameter of the threads in the hole. This allows the shaft to be inserted into the threaded hole by pushing it in directly, without turning. Once the shaft halves are inserted, they spring back to their uncompressed orientation. The thread segments on the shaft halves mesh with the thread in the hole, resisting attempts to remove the device without unscrewing.

A head is attached to the shaft at the end of the shaft opposite the slot. The head may be shaped in any of the shapes used for conventional machine screws. The head and shaft are made from single piece of resilient material. The resiliency is what causes the shaft halves to return to their uncompressed orientation and allows the device to be removed and installed more than once without being damaged.

The above, as well as additional objects, features, and advantages of the invention will become apparent in the following detailed description.

DESCRIPTION OF THE PREFERRED EMBODIMENT

Figure 1:
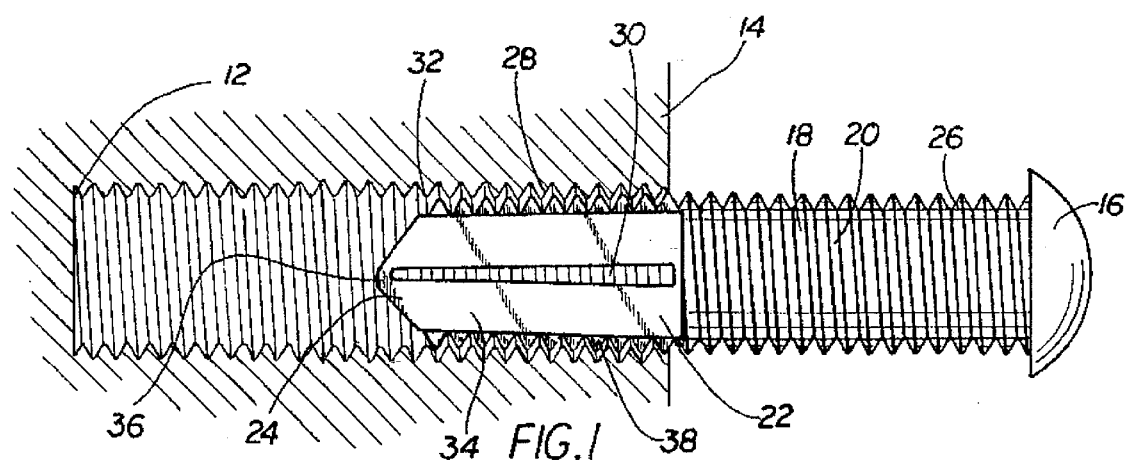
FIG. 1 is a front elevation of a machine screw according to the invention, as it appears when partially installed in a workpiece, the workpiece being shown in cross section.

The preferred embodiment of the machine screw 10 of the invention includes a head 16 and a cylindrical shaft 18 manufactured from a single piece of resilient material. Materials such as nylon are envisioned for typical use, but metal having the necessary resilience may be used where the screw 10 is expected to undergo only one insertion, or a small number of insertions, in its lifetime. The head 16 may be shaped in any of the styles widely known for conventional screws and bolts. The screw 10 installs into a threaded hole 12 defined in a workpiece 14.

The shaft 18 includes a head section 20, a slot section 22 and a tip 24 at the end of the slot section 22 distal to the head 16. The head section 20 is similar to a conventional machine screw in construction, with the shaft 20 being covered by a helical thread 26 extending along the circumference of the shaft 18 from a point below the head 16 down to the slot section 22. The diameter of the shaft 18 is smaller than the inner diameter 27 of the threaded hole 12, the inner diameter 27 of the threaded hole 12 being defined as the minimum distance between threads on opposite sides of the hole 12. The thread 26 matches the thread 28 in the threaded hole 12.

The slot section 22 includes an elongated slot 30 passing through the center of the shaft 18. The slot 30 divides the shaft 18 into two shaft halves 32 and 34 that can be compressed together. The two shaft halves 32 and 34 are joined together at the tip 24 by a thin bridge section 36. The tip 24 should be tapered to make it easier to insert into the threaded hole 12. A series of helical thread segments 38 extend down the surfaces of the shaft halves 32 and 34, following the pattern of the helical thread 26 on the head section 20 of the shaft 18.

When pressure is exerted on the shaft halves 32 and 34 perpendicular to the slot 30, the slot halves 32 and 34 will deform inwardly. With the shaft halves 32 and 34 in this position, the outer diameter of the thread segments 38 is smaller than the inner diameter 27 of the threaded hole 12, the outer diameter of the thread segments 38 being defined as the distance from the outside edge of a thread segment on the first shaft half 32 to the outside edge of a thread segment 38 directly opposite the shaft axis on the other shaft half 34.

Figure 2:
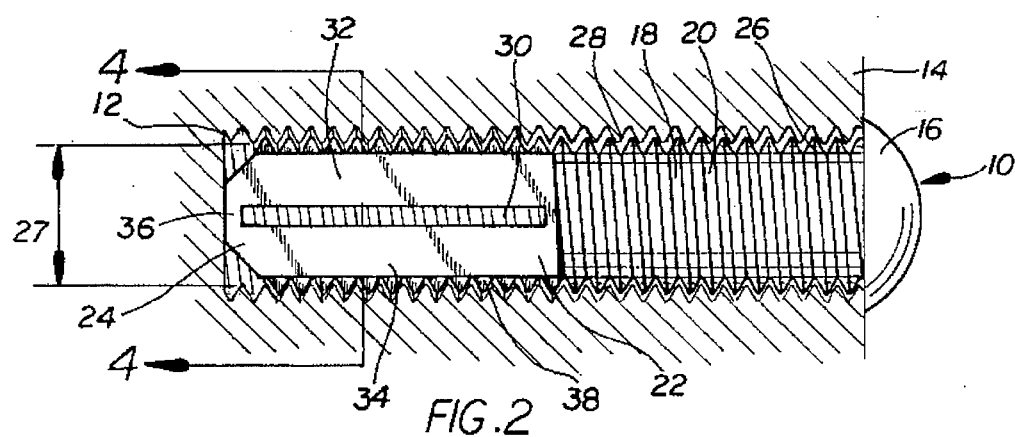
FIG. 2 is a front elevation thereof, showing the machine screw as it appears when fully installed.
Figure 3:
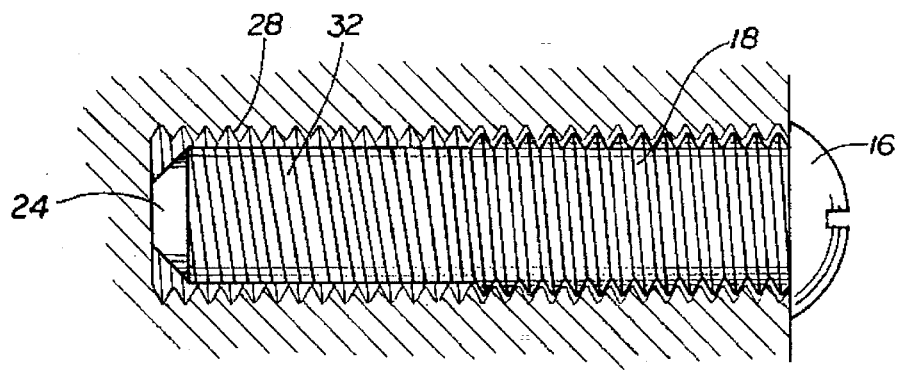
FIG. 3 is top plan view thereof, showing the machine screw as it appears when fully installed.

As shown in FIG. 1, the tip 24 of the shaft 18 is inserted in the mouth of the threaded hole 12. A force directed into the hole 12 is applied to the head 16, causing the thread segments 38 to press against the thread 28 in the threaded hole 12. The component of this pressure that is perpendicular to the shaft halves 32 and 34 deforms the halves until the outer diameter of the thread segments 38 is smaller than the inner diameter of the threaded hole 12. The thread segments 38 will then move past the hole's thread 28. The pressure perpendicular to the shaft halves 32 and 34 will then be removed, allowing them to spring at least partially back to their unstressed orientation. As the shaft continues its travel into the threaded hole 12, the thread segments 38 will again contact the hole thread 28, and the process of deformation, movement of the thread segments 38 past the hole thread 28, and unbending of the shaft halves 32 and 34 will be repeated. This repeated action is similar to that of a ratchet and pawl, allowing motion in one direction only. The action ceases when the shaft halves 32 and 34 are no longer able to deform sufficiently so that the outer diameter of the thread segments 38 is smaller than the inner diameter of the threaded hole 12. At this point, the portion of the shaft 18 remaining outside the threaded hole 12 may be screwed into the hole 12 in the conventional manner, as shown in FIGS. 2 and 3.

The screw 10 must be unscrewed to remove it from the threaded hole 12. This is true even for the slot section 22 of the shaft 18, since the force required to remove the slot section 22 without rotation should be considerably greater than the insertion force. The ratio of removal force to insertion force may be increased by the use of a unsymmetrical profile on the thread segments 38, resulting in less of the removal force being translated into pressure perpendicular to the shaft.

Figure 4:
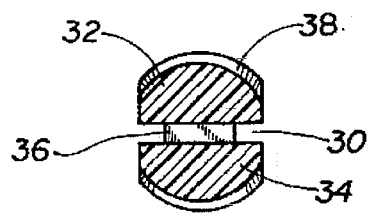
FIG. 4 is a cross sectional view thereof, as seen along lines 4—4 in FIG. 2.

FIG. 4 shows the profile of the thread segments 38. One method of manufacturing the thread segments 38 is to bevel a conventional helical thread to remove the segment defined by a tangent to the shaft 18 touching the shaft 18 at the center of the slot 30. Different profiles may be used, provided that the outer diameter of the thread segments 38 is smaller than the inner diameter of the threaded hole 12 when the shaft halves 32 and 34 are compressed together.

An alternate embodiment is envisioned (not shown) for applications where the required retaining force of the screw 10 is small, as in holding switchplates or electrical outlet faceplates in position. In this embodiment, the head section 20 is absent, and the shaft 18 consists entirely of the slot section 22. This embodiment could be pushed completely into the threaded hole 12, without requiring any rotation of the screw 10.

The design of the screw 10 allows it to correct for small errors in alignment during insertion. If the screw is inserted at an angle, the shaft halves will still compress enough to allow partial insertion; when the halves reach their maximum deformation, the forces on the screw will align it with the axis of the hole, provided the screw is not being rigidly held at its initial attitude. Thus, the device is well adapted for blind installations, such as when the operator must install the screw in a recess or confined space and cannot see the screw during installation. The ability of the screw to correct for small errors in placement of the screw also makes it useful for robotic assembly work, where tolerances in the robot's movement make installation of conventional machine screws troublesome.

The machine screw of the invention has several advantages over the prior art. The machine screw can be inserted into a threaded hole without turning. It can also be inserted at an angle without jamming, and will realign itself with the hole. In addition, the machine screw of the invention can be used as a direct replacement for a conventional machine screw. Finally, unlike "Christmas tree" fasteners, the machine screw can be repeatedly removed and installed without being damaged.

The invention has been shown in only one embodiment. It should be apparent to those skilled in the art that the invention is not so limited, but is susceptible to various changes and modifications without departing from the spirit of the invention.

What is claimed is:

1. A machine screw for attachment to a threaded hole, said machine screw comprising:

a head adapted to being rotated;

a cylindrical shaft connected to the head and having a proximal portion and a distal portion, the proximal shaft portion being adjacent to the head;

the distal shaft portion including an elongated slot therein;

at least a portion of the proximal shaft portion adjacent to the distal shaft portion including threads on the surface thereof;

the distal shaft portion including a plurality of thread segments on the surface thereof; and a compressible bridge integral with a distal end of the distal shaft portion thereby defining a distal end of the slot and the shaft portion of the machine screw has an undeformed first position wherein the outside diameter of the threads define a cylinder having parallel sides and a deformed second position whereby the compressible bridge portion is deformed by compression and the outside diameter of the threads of the distal shaft portion has a reduced diameter adapted to be smaller than an inside diameter of the threaded hole for longitudinal sliding insertion therein.

2. A machine screw as recited in claim 1, wherein the machine screw is fabricated from a resilient material.

3. A machine screw as recited in claim 1, wherein the head includes a slot for receiving a screwdriver.

4. A machine screw as recited in claim 1, wherein the thread segments terminate in edges parallel to a line tangent to the shaft at the center of the slot.

\* \* \* \* \*